(12) United States Patent
Nakano et al.

(10) Patent No.: US 11,420,582 B2
(45) Date of Patent: Aug. 23, 2022

(54) ATTACHMENT STRUCTURE FOR SIDE AIRBAG DEVICE

(71) Applicant: TOYODA GOSEI CO., LTD., Kiyosu (JP)

(72) Inventors: Nobuya Nakano, Osaka (JP); Ryoichi Kato, Kiyosu (JP); Koji Shibayama, Kiyosu (JP); Shinji Yamada, Kariya (JP); Tomohisa Houdatsu, Kariya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/182,606

(22) Filed: Feb. 23, 2021

(65) Prior Publication Data
US 2021/0284094 A1 Sep. 16, 2021

(30) Foreign Application Priority Data
Mar. 12, 2020 (JP) .............................. JP2020-042894

(51) Int. Cl.
*B60R 21/207* (2006.01)
*B60R 21/231* (2011.01)
(52) U.S. Cl.
CPC ...... *B60R 21/207* (2013.01); *B60R 21/23138* (2013.01); *B60R 2021/23146* (2013.01)

(58) Field of Classification Search
None
See application file for complete search history.

(56) References Cited

FOREIGN PATENT DOCUMENTS

| CN | 109927663 A | * | 6/2019 | ........... B60R 21/207 |
|---|---|---|---|---|
| DE | 102017106499 A1 | * | 9/2018 | ........... B60R 21/207 |
| JP | 09-323609 A | | 12/1997 | |
| JP | 2019-059434 A | | 4/2019 | |
| KR | 20150112147 A | * | 10/2015 | |

* cited by examiner

*Primary Examiner* — Faye M Fleming
(74) *Attorney, Agent, or Firm* — Posz Law Group, PLC

(57) ABSTRACT

An attachment structure, for a side airbag device including an airbag that is to be deployed and inflated on a side of an occupant seated on a seat in a vehicle interior under pressure of a gas supplied from an inflator, includes an attachment member via which the airbag is attached inside the seat. The attachment member includes a support portion that supports the airbag before the airbag is deployed and inflated, an attachment portion that is attached inside the seat, and a guide portion that guides the airbag to a seat outer side at a time when the airbag is deployed and inflated. The guide portion is provided so as to correspond to a part of the airbag supported by the support portion.

4 Claims, 5 Drawing Sheets

ATTACHMENT STRUCTURE FOR SIDE AIRBAG DEVICE

CROSS-REFERENCE TO RELATED APPLICATION(S)

This application is based upon and claims the benefit of priority from prior Japanese patent application No. 2020-042894 filed on Mar. 12, 2020, the entire contents of which are incorporated herein by reference.

BACKGROUND

1. Field of the Invention

The present invention relates to an attachment structure for a side airbag device that is mounted on a vehicle and that protects an occupant from impact of a collision against the vehicle from a lateral side.

2. Description of the Related Art

In general, the side airbag device includes an airbag to be deployed and inflated between a body side portion of a vehicle and an occupant seated on a seat in a vehicle interior. Such a side airbag device is disposed in the seat and attached to a seat frame via an inclined wall (attachment member) (with reference, for example, JP-A-H09-323609). In this case, the inclined wall has an inclined portion (guide portion) that is inclined toward a seat outer side, and the deployed and inflated airbag is guided to the seat outer side by the inclined portion so as to be deployed and inflated in a normal direction.

The airbag of the side airbag device as described above is guided to the seat outer side by the inclined portion of the inclined wall when the airbag is deployed and inflated. However, since the inclined portion of the inclined wall extends so as to correspond to the entire side airbag device, the inclined wall is large and heavy. Therefore, there is a room for improvement in reducing the weight of the inclined wall.

SUMMARY

The present invention has been made focusing on such a problem existing in the related art. An object of the present invention is to provide an attachment structure for a side airbag device in which weight of an attachment member for attaching the airbag inside the seat can be reduced.

Hereinafter, means for solving the above-described problem and effects thereof will be described.

In order to solve the above problem, the present invention provides an attachment structure for a side airbag device including an airbag that is to be deployed and inflated on a side of an occupant seated on a seat in a vehicle interior under pressure of a gas supplied from an inflator, and the attachment structure includes: an attachment member via which the airbag is attached inside the seat. The attachment member includes a support portion that supports the airbag before the airbag is deployed and inflated, an attachment portion that is attached inside the seat, and a guide portion that guides the airbag to a seat outer side at a time when the airbag is deployed and inflated, and the guide portion is provided so as to correspond to a part of the airbag supported by the support portion.

According to the configuration, since the guide portion is provided so as to correspond to a part of the airbag, the guide portion can be made smaller than that in a case where the guide portion is provided so as to correspond to the entire airbag. Therefore, the weight of the attachment member for attaching the airbag inside the seat can be reduced.

In the above-described attachment structure for a side airbag device, an allowable region that allows abnormal deployment and inflation of the airbag is formed inside the seat in a direction on a seat inner side of a direction in which the airbag is normally deployed and inflated when viewed from the airbag, and the guide portion is preferably disposed at a position corresponding to the allowable region.

In general, if there is an allowable region that allows abnormal deployment and inflation of the airbag, for example, a gap, inside the seat, the airbag may be deployed and inflated in a direction in which the allowable area exists. In this regard, according to the configuration, the guide portion can prevent the airbag from being deployed and inflated in a direction toward the allowable region in the seat. That is, even if the allowable region is formed inside the seat in a direction on the seat inner side of the direction in which the airbag is normally deployed and inflated when viewed from the airbag, the guide portion can correct the direction in which the airbag is deployed and inflated to a direction on the seat outer side of the direction in which the allowable region exists.

In the above-described attachment structure for a side airbag device, the guide portion is preferably located on a seat outer side of the attachment portion.

According to the configuration, the guide portion can easily guide the airbag to the seat outer side at a time when the airbag is deployed and inflated.

In the above-described attachment structure for a side airbag device, it is preferable that an attachment surface of the attachment portion with respect to the seat extends toward a vehicle front side in a plan view, and the guide portion includes a first surface extending along the attachment surface in a plan view and a second surface extending from a tip end of the first surface toward the seat outer side so as to intersect the first surface in a plan view.

According to the configuration, a space in the attachment member where the airbag before deployment and inflation is supported is secured by the first surface, and the airbag can be easily guided to the seat outer side by the second surface at a time when the airbag is deployed and inflated.

In the attachment structure for a side airbag device, the attachment member is preferably included in the side airbag device.

According to the configuration, the attachment member can be easily handled.

According to the present invention, the weight of the attachment member for attaching the airbag inside the seat can be reduced.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment of an attachment structure for a side airbag device will be described with reference to the drawings.

Figure 1:
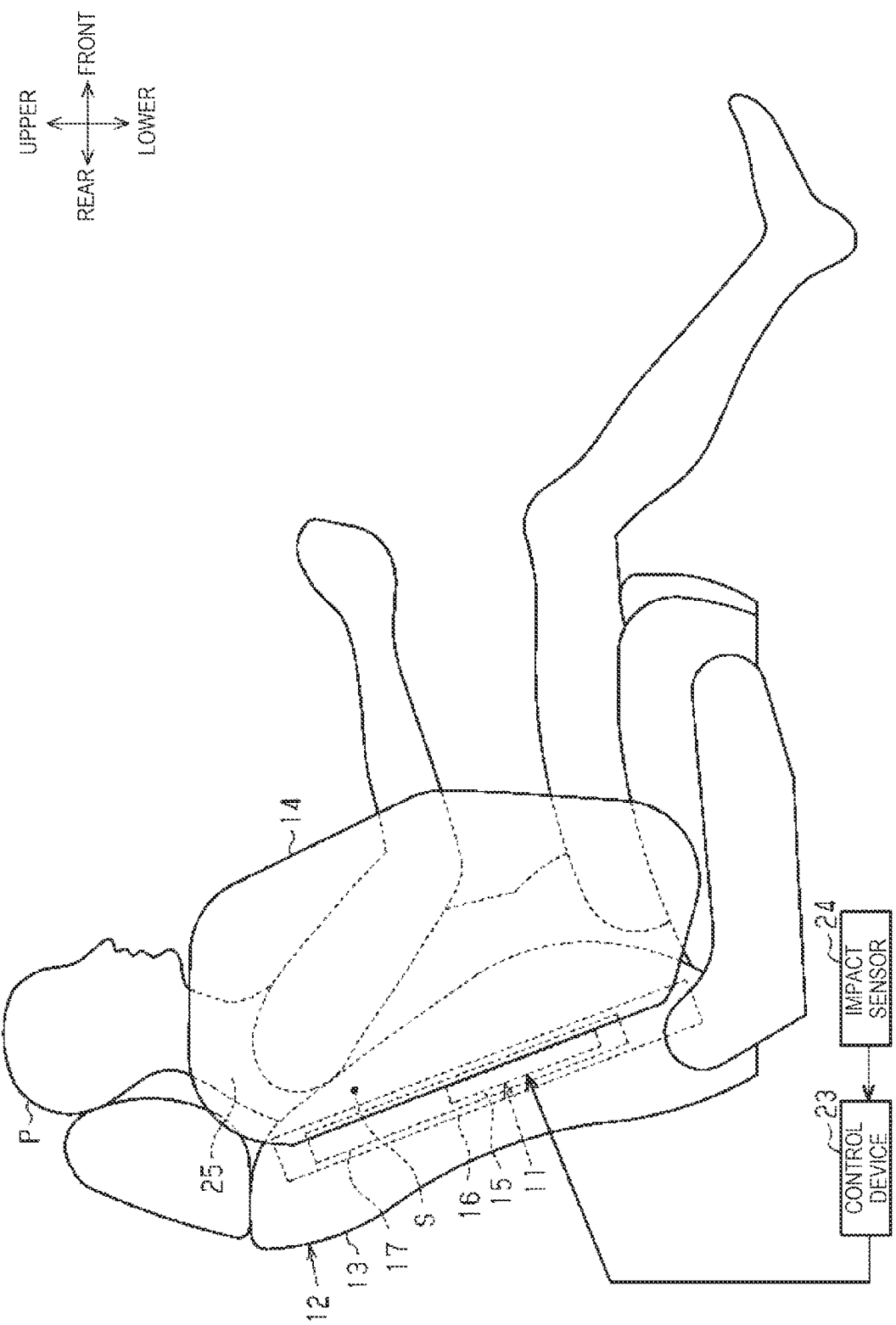
FIG. 1 is a side view illustrating a side airbag device according to an embodiment in a state where an airbag thereof was inflated.
Figure 2:
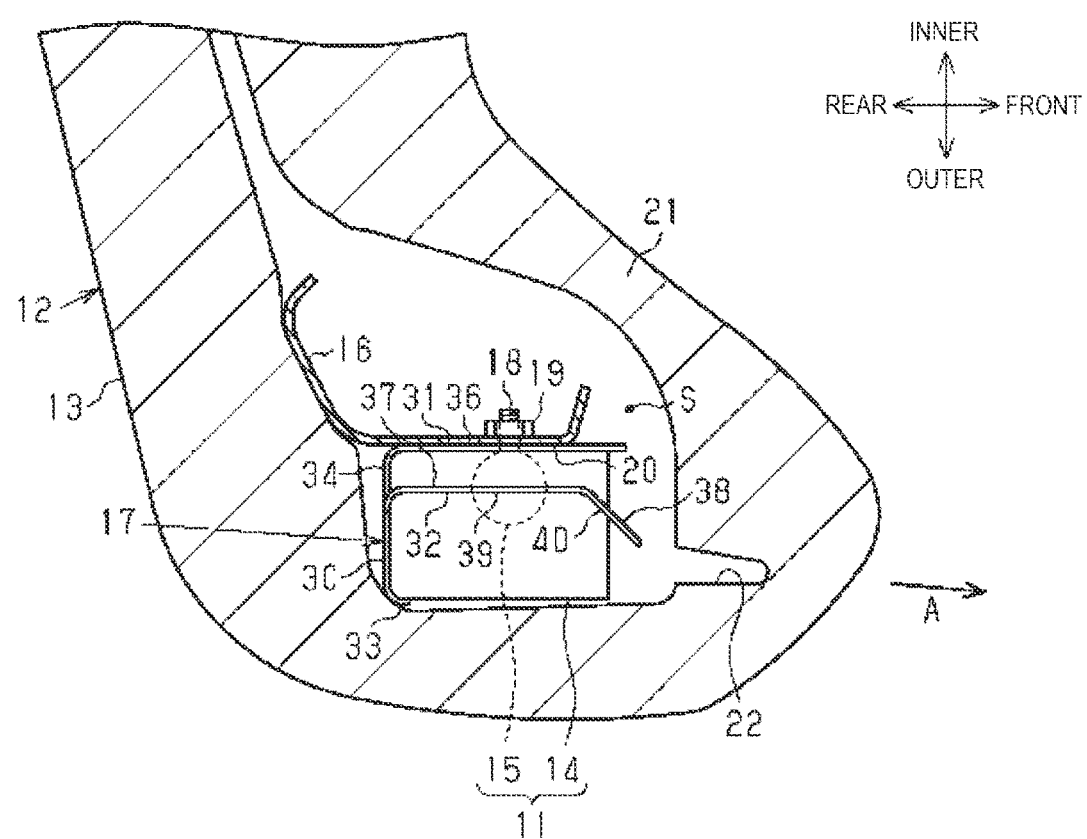
FIG. 2 is a schematic cross-sectional view illustrating a state in which the side airbag device is attached inside a seatback.

As shown in FIGS. 1 and 2, a side airbag device 11 includes an airbag 14 that is accommodated in a folded state inside a seatback 13 of a seat 12 in a vehicle, and an inflator 15 that supplies an inflation gas to the airbag 14. The inflator 15 is attached together with the airbag 14 to a vehicle outer-side end of a frame 16 in the seatback 13 via an attachment member 17.

That is, the side airbag device 11 is attached to the frame 16 via the attachment member 17. The inflator 15 accommodated inside the seatback 13 is fixed together with the folded airbag 14 to an attachment target surface 20 that is a vehicle outer-side surface of the frame 16 by a bolt 18 and a nut 19 via the attachment member 17.

In the seatback 13, for example, a seat pad 21 made of an elastic material such as urethane foam is disposed so as to surround the side airbag device 11, the attachment member 17, and the vehicle outer-side end of the frame 16. The seat pad 21 is covered by a cover (not shown). A slit 22 is formed in the seat pad 21 of the seatback 13 at a position facing a position on a front surface of the airbag 14 that is closer to a vehicle outer side than a center in a vehicle width direction (a direction orthogonal to both a front-rear direction and an upper-lower direction) such that the slit 22 extends obliquely forward toward a vehicle outer side.

The seat pad 21 is broken so as to be torn from the slit 22 under a pressure when the airbag 14 is deployed and inflated. Therefore, when viewed from the airbag 14, a direction in which the slit 22 is provided is a direction in which the airbag 14 is desired to be deployed and inflated, that is, a direction in which the airbag 14 is to be deployed and inflated (a direction indicated by an arrow A in FIG. 2) when the airbag 14 is normally deployed and inflated.

A gap S is formed as an example of an allowable region that allows abnormal deployment and inflation of the airbag 14, at a position that is in front of an upper end of the airbag 14 inside the seatback 13 and that is located on a seat 12 inner side of the slit 22. That is, the gap S is formed inside the seatback 13 in a direction on the seat 12 inner side of a direction in which the airbag 14 is normally deployed and inflated when viewed from the upper end of the airbag 14.

The inflator 15 is electrically connected to a control device 23 mounted on the vehicle, and the control device 23 controls supply of the inflation gas to the airbag 14. An impact sensor 24 that is mounted on a lateral side of the vehicle and detects a side collision of the vehicle is electrically connected to the control device 23. When impact of a side collision is applied to the vehicle, the impact sensor 24 outputs a detection signal to the control device 23. Based on the detection signal from the impact sensor 24, the control device 23 actuates the inflator 15 to supply the inflation gas to the airbag 14.

Figure 3:
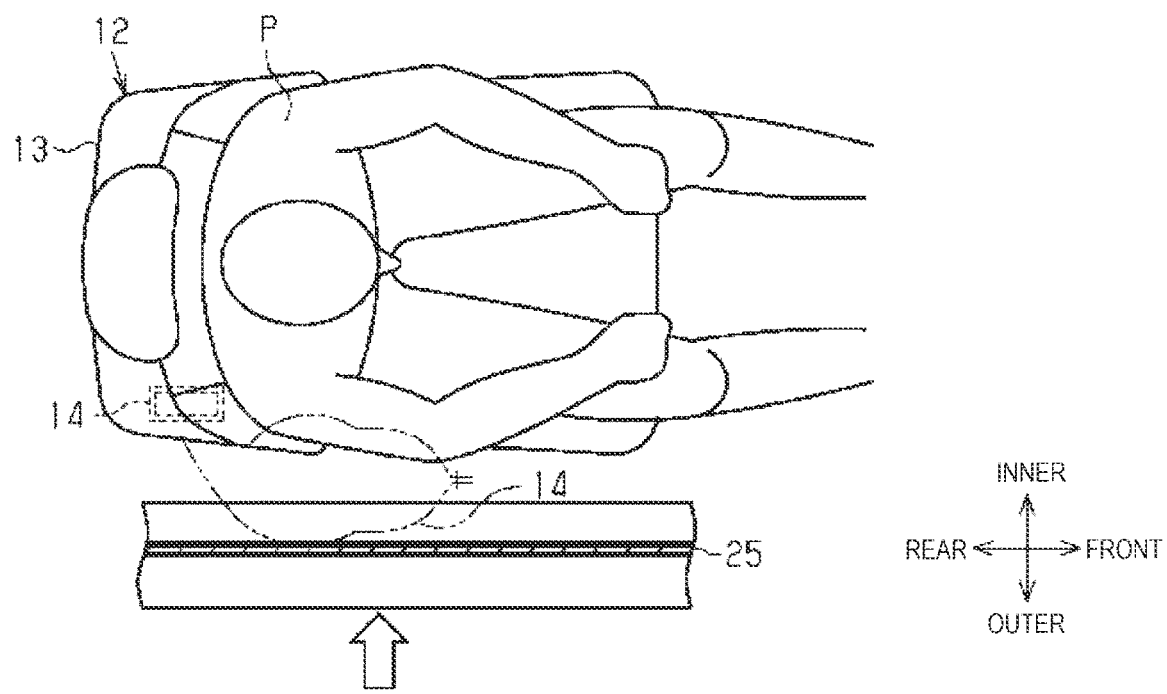
FIG. 3 is a plan view illustrating a positional relationship between a seat and a body side portion in a vehicle.

Further, when the inflation gas is supplied from the inflator 15 to the airbag 14 in a folded state, the airbag 14 is deployed and inflated under pressure of the gas and pops out forward from the seatback 13 with a portion of the airbag 14 in the vicinity of the inflator 15 remaining inside the seatback 13. The airbag 14 popping out from the seatback 13 is deployed toward the front of the vehicle and is inflated between an occupant P seated on the seat 12 in a vehicle interior and a body side portion 25 such as a door and a pillar of the vehicle, as indicated by a two-dot chain line in FIG. 3.

That is, the airbag 14 is deployed and inflated on a side of the occupant P seated on the seat 12 in the vehicle interior. In this case, a size of the airbag 14 in a deployed and inflated state is large enough to protect, for example, the occupant P from a chest portion to a waist portion. That is, the airbag 14 is deployed and inflated so as to correspond to the occupant P from the chest portion to the waist portion.

Further, in this case, the occupant P seated on the seat 12 in the vehicle interior has same physique as that of a collision test dummy. The dummy is, for example, an AM50 (model covering 50% of an American adult male) of Worldwide Harmonized Side Impact Dummy (WorldSID). A white arrow in FIG. 3 indicates an impact application direction when the impact is applied to the body side portion 25 due to a side collision of the vehicle.

Next, a configuration of the attachment member 17 will be described in detail.

Figure 4:
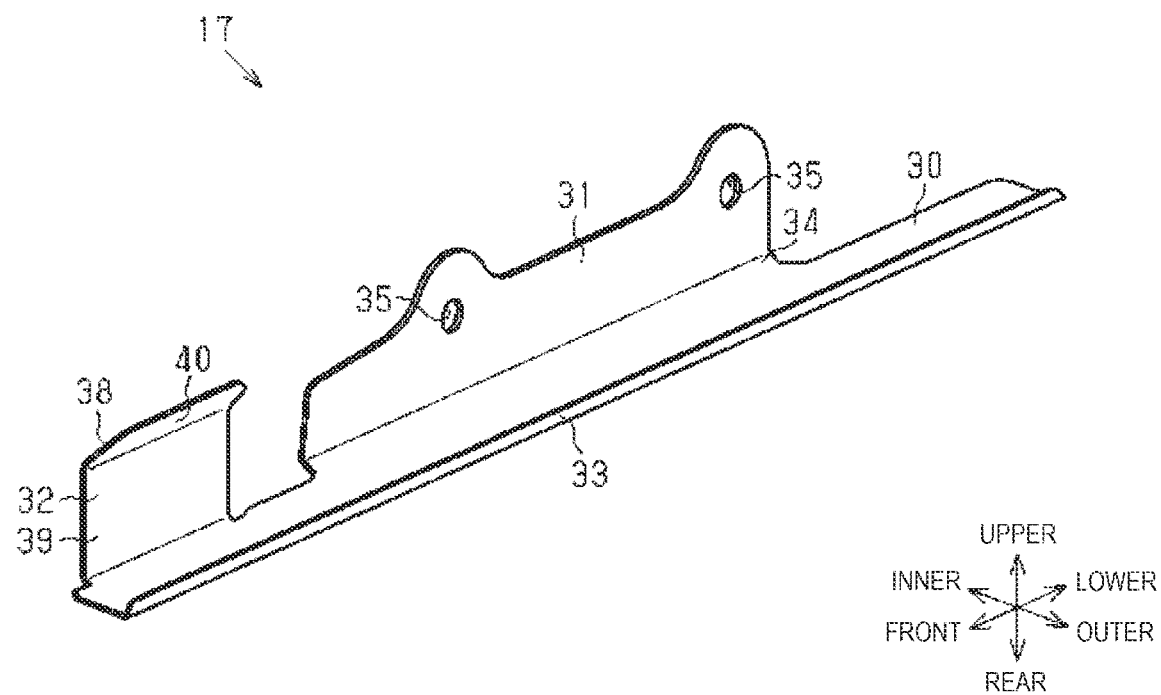
FIG. 4 is a perspective view of an attachment member.
Figure 5:
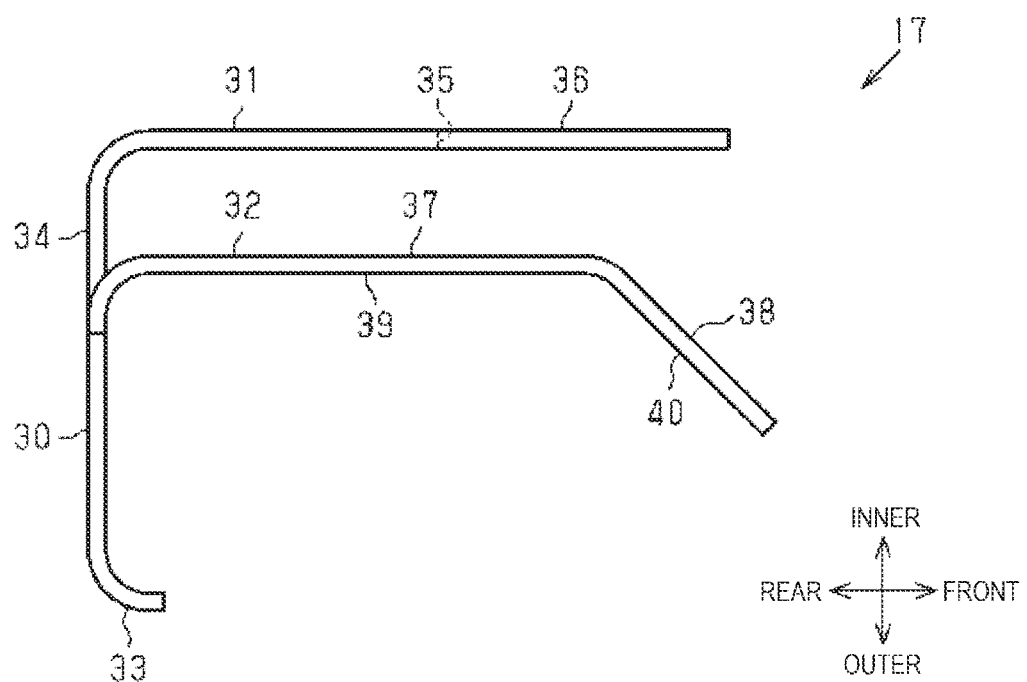
FIG. 5 is a plan view of the attachment member.

As shown in FIGS. 2, 4 and 5, the attachment member 17 is a sheet metal part, and includes a substantially rectangular plate-shaped support portion 30 extending in the upper-lower direction, a substantially rectangular plate-shaped attachment portion 31 provided at a center of the support portion 30 in the upper-lower direction, and a substantially rectangular plate-shaped guide portion 32 provided at an upper end of the support portion 30. The support portion 30 is disposed such that a lateral direction thereof coincides with the vehicle width direction.

The support portion 30 has a curved portion 33 formed by curving the entire vehicle outer-side end edge portion forward at a substantially right angle. The support portion 30 supports the side airbag device 11, in a state where the airbag 14 is folded in a rod shape, by the entire front surface and the curved portion 33. That is, the support portion 30 supports the side airbag device 11, in a state before the airbag 14 is deployed and inflated, by the entire front surface and the curved portion 33. A projecting portion 34 projecting toward the vehicle inner side is formed at a vehicle inner-side end edge portion of the support portion 30 at a center in the upper-lower direction. The projecting portion 34 has an elongated substantially rectangular plate shape extending in the upper-lower direction.

The attachment portion 31 has a substantially rectangular plate shape extending in the upper-lower direction, and extends to project forward from the entire vehicle inner-side end edge portion of the projecting portion 34. A length of the attachment portion 31 in the upper-lower direction is the same as that of the projecting portion 34. The attachment portion 31 is arranged such that a longitudinal direction thereof coincides with the upper-lower direction and a lateral direction thereof coincides with the front-rear direction. That is, the attachment portion 31 is arranged substantially at a right angle with respect to the support portion 30.

A pair of through holes 35 into which the bolts 18 can be inserted are formed in the attachment portion 31 at intervals in the upper-lower direction. The attachment portion 31 is attached on the frame 16 together with the side airbag device 11 by a pair of bolts 18 and a pair of nuts 19 in a pair of through holes 35 in a state where the attachment portion 31 is in surface contact with the attachment target surface 20 of the frame 16. The attachment surface 36 of the attachment portion 31 facing the attachment target surface 20 of the frame 16 faces the vehicle inner side and extends toward a vehicle front side in a plan view.

The guide portion 32 extends forward from the vehicle inner-side end edge portion of an upper end of the support portion 30. Therefore, the guide portion 32 is provided on the support portion 30 so as to correspond to an upper end (a part) of the side airbag device 11 supported by the support portion 30. In this case, the guide portion 32 is disposed at a position at the same height as the gap S.

The guide portion 32 is located on a seat 12 outer side (vehicle outer side) of the attachment portion 31 so as to be separated from the attachment portion 31 by a length of the projecting portion 34 in the vehicle width direction. The guide portion 32 includes a general portion 37 extending forward from the support portion 30 and a bent portion 38 that is bent and extends from a front end (tip end) of the general portion 37 toward the vehicle outer side by an angle of, for example, about 45° with respect to the front. The general portion 37 is disposed parallel to the attachment portion 31.

A surface of the general portion 37 on the vehicle outer side is set as a first surface 39, and a surface of the bent portion 38 on the vehicle outer side is set as a second surface 40. The first surface 39 extends along the attachment surface 36 in a plan view, and the second surface 40 extends from a front end (tip end) of the first surface 39 toward the seat 12 outer side (vehicle outer side) so as to intersect the first surface 39 at an angle of about 45° in a plan view.

The bent portion 38 partitions the gap S and the upper end of the folded airbag 14 that is located on the vehicle outer side of the guide portion 32. When the airbag 14 supported by the support portion 30 is deployed and inflated, the guide portion 32 guides the airbag 14 to the seat 12 outer side (vehicle outer side) by the second surface 40 of the bent portion 38.

A forward projection amount of the guide portion 32 from the support portion 30 is slightly larger than a forward projection amount of the attachment portion 31 from the support portion 30. A length of the guide portion 32 in the upper-lower direction in the present embodiment is set to about one-third of a length of the attachment portion 31 in the upper-lower direction. The guide portion 32 of the attachment member 17 and a periphery thereof, that is, a portion of the attachment member 17 which is above the attachment portion 31, is coated with a synthetic resin.

Next, a function of the attachment member 17 when the side airbag device 11 is operated will be described.

When impact based on a side collision is applied to the vehicle, the inflation gas from the inflator 15 is supplied to the airbag 14 folded inside the seatback 13 of the seat 12, and the airbag 14 is deployed and inflated. At this time, the airbag 14 is guided to the seat 12 outer side (vehicle outer side) by the bent portion 38 of the guide portion 32 of the attachment member 17. Therefore, the airbag 14 is prevented from being deployed and inflated toward the occupant P on a seat 12 inner side (vehicle inner side) through the gap S.

Thus, for example, even if the airbag 14 is deployed and inflated in a state where a young child as an occupant P is seated on the seat 12 facing a seatback 13 side and standing on his/her knees (out of position), the impact that the young child receives from the airbag 14 when the airbag 14 is deployed and inflated is effectively reduced.

The airbag 14 guided to the seat 12 outer side (vehicle outer side) breaks the seat pad 21 so as to tear the seat pad 21 from the slit 22 under the pressure of the inflation, and pops out from inside the seatback 13 in a direction slightly toward the vehicle outer side (a direction indicated by the arrow A in FIG. 2) with respect to the front. The airbag 14 that pops out from inside the seatback 13 is inflated at a normal position between the occupant P seated on the seat 12 and the body side portion 25 of the vehicle, and appropriately protects the occupant P from the impact of a side collision.

Thus, the attachment member 17 can easily guide the deployed and inflated airbag 14 in a regular direction (the direction indicated by the arrow A in FIG. 2) simply by the guide portion 32 that is disposed to correspond to the upper end of the side airbag device 11.

According to the embodiment described in detail above, the following effects are exhibited.

(1) The guide portion 32 of the attachment member 17 is provided so as to correspond to the upper end of the side airbag device 11 supported by the support portion 30. According to the configuration, the guide portion 32 can be made smaller than that in a case where the guide portion 32 is provided so as to correspond to the entire side airbag device 11. Therefore, the weight of the attachment member 17 for attaching the side airbag device 11 inside the seatback 13 can be reduced.

(2) The guide portion 32 of the attachment member 17 is disposed at a position corresponding to the gap S inside the seatback 13. In general, if there is a gap S inside the seatback 13, the airbag 14 may be deployed and inflated in a direction in which the gap S exists. In this regard, according to the configuration, the guide portion 32 can prevent the airbag 14 from being deployed and inflated in a direction toward the gap S inside the seatback 13. That is, even if the gap S is formed inside the seatback 13 in a direction on the seat 12 inner side of the direction in which the airbag 14 is normally deployed and inflated when viewed from the airbag 14, the guide portion 32 can correct the direction in which the airbag 14 is deployed and inflated to a direction on the seat 12 outer side of the direction in which the gap S exists.

(3) The guide portion 32 of the attachment member 17 is located on the seat 12 outer side of the attachment portion 31. According to the configuration, the guide portion 32 can easily guide the airbag 14 to the seat 12 outer side (vehicle outer side) at a time when the airbag 14 is deployed and inflated.

(4) The guide portion 32 of the attachment member 17 has a first surface 39 that extends along the attachment surface 36 in a plan view and a second surface 40 that extends from the front end of the first surface 39 toward the seat 12 outer side (vehicle outer side) so as to intersect the first surface 39 in a plan view. According to the configuration, a space in the attachment member 17 where the airbag 14 before deployment and inflation is supported is secured by the first surface 39, and the airbag 14 can be easily guided to the seat 12 outer side (vehicle outer side) by the second surface 40 at a time when the airbag 14 is deployed and inflated.

(5) The guide portion 32 of the attachment member 17 is coated with a synthetic resin. According to the configuration, even if the airbag 14 rubs against the guide portion 32 when the airbag 14 is deployed and inflated, a surface of the guide portion 32 is slippery due to the synthetic resin, so that it is possible to effectively prevent the airbag 14 from being caught by the guide portion 32 and being torn, or prevent a behavior of the airbag 14 during deployment and inflation from being hindered by the guide portion 32.

(Modification)

The embodiment described above can be modified as follows. The embodiment described above and the following modification can be implemented in combination with each other within a technically consistent range.

Figure 6:
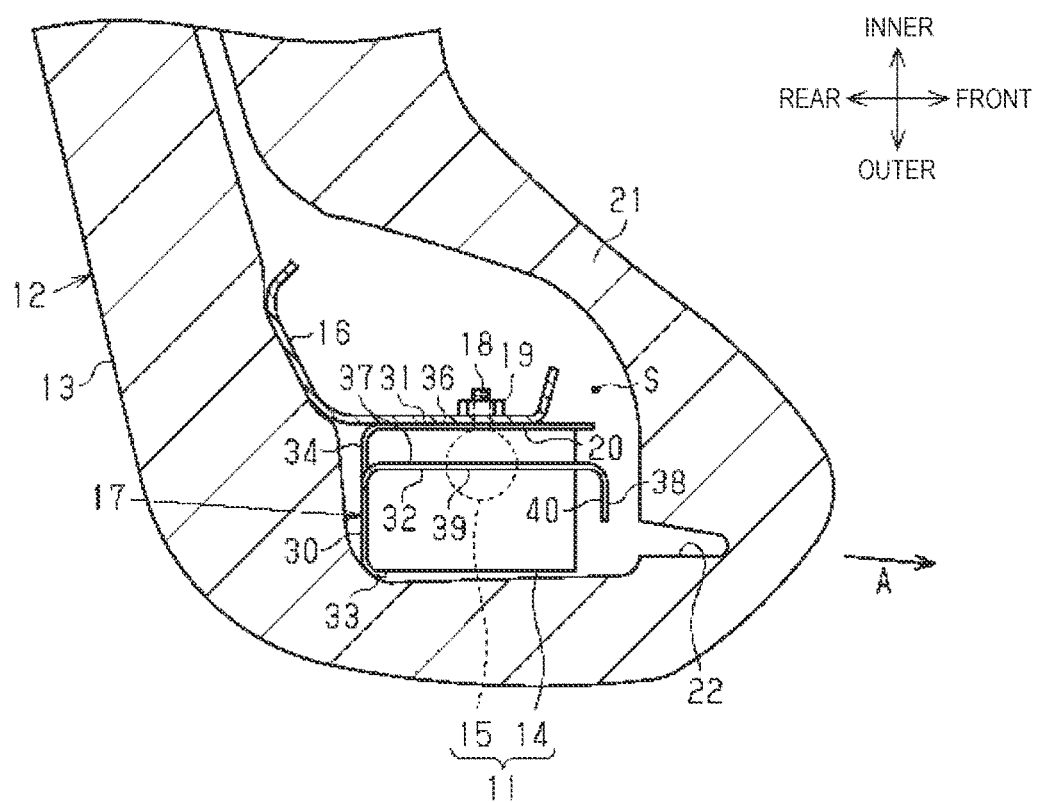
FIG. 6 is a schematic cross-sectional view illustrating a state in which a side airbag device according to a modification is attached inside a seatback.

As shown in FIG. 6, in the guide portion 32 of the attachment member 17, the bent portion 38 may be configured to be bent and extend from the front end (tip end) of the general portion 37 in a direction facing the vehicle outer side by an angle of, for example, about 90° with respect to the front.

The allowable region that allows abnormal deployment and inflation of the airbag 14 may be configured by, for example, a region in which the gap S is filled with a cushion material having the same property as the seat pad 21 or a space filling material having a property different from that of the cushion material.

The guide portion 32 of the attachment member 17 does not necessarily have to be located on the seat 12 outer side of the attachment portion 31. That is, the position of the guide portion 32 in the vehicle width direction may be the same as that of the attachment portion 31, or may be located on the seat 12 inner side of the attachment portion 31.

The guide portion 32 of the attachment member 17 does not necessarily have to be disposed at a position corresponding to the gap S inside the seatback 13.

In the attachment member 17, as long as the guide portion 32 is provided on the support portion 30 so as to correspond a part of the side airbag device 11 supported by the support portion 30, the guide portion 32 does not necessarily have to be provided on the support portion 30 so as to correspond the upper end of the side airbag device 11 supported by the support portion 30. That is, in the attachment member 17, the guide portion 32 may be provided on the support portion 30 so as to correspond a central portion of the side airbag device 11 supported by the support portion 30, or may be provided on the support portion 30 so as to correspond a lower end of the side airbag device 11 supported by the support portion 30.

The attachment member 17 may be made of a synthetic resin.

In the attachment member 17, the guide portion 32 may be in a planar rectangular plate shape and may be provided to extend from the vehicle inner-side end edge portion of the support portion 30 so as to be inclined toward the vehicle outer side with respect to the support portion 30.

The attachment member 17 is not included in the side airbag device 11 in the above embodiment, but the attachment member 17 may be included in the side airbag device 11. Thus, the attachment member 17 can be easily handled.

The side airbag device 11 may be a so-called far side airbag device that is attached to a vehicle inner-side end of the frame 16 in the seatback 13 via the attachment member 17.

What is claimed is:

1. An attachment structure for a side airbag device including an airbag that is to be deployed and inflated on a side of an occupant seated on a seat in a vehicle interior under pressure of a gas supplied from an inflator, the attachment structure comprising
   an attachment member via which the airbag is attached inside the seat, wherein:
   the attachment member includes a support portion that supports the airbag before the airbag is deployed and inflated, an attachment portion that is attached inside the seat, and a guide portion that guides the airbag to a seat outer side at a time when the airbag is deployed and inflated;
   the guide portion is provided so as to correspond to a part of the airbag supported by the support portion;
   an allowable region that allows abnormal deployment and inflation of the airbag is formed inside the seat in a direction on a seat inner side of a direction in which the airbag is normally deployed and inflated when viewed from the airbag; and
   the guide portion is disposed at a position corresponding to the allowable region.

2. The attachment structure for a side airbag device according to claim 1, wherein the guide portion is located on a seat outer side of the attachment portion.

3. An attachment structure for a side airbag device including an airbag that is to be deployed and inflated on a side of an occupant seated on a seat in a vehicle interior under pressure of a gas supplied from an inflator, the attachment structure comprising
   an attachment member via which the airbag is attached inside the seat, wherein:
   the attachment member includes a support portion that supports the airbag before the airbag is deployed and inflated, an attachment portion that is attached inside the seat, and a guide portion that guides the airbag to a seat outer side at a time when the airbag is deployed and inflated;
   the guide portion is provided so as to correspond to a part of the airbag supported by the support portion;
   an attachment surface of the attachment portion with respect to the seat extends toward a vehicle front side in a plan view; and
   the guide portion includes a first surface extending along the attachment surface in a plan view and a second surface extending from a tip end of the first surface toward the seat outer side so as to intersect the first surface in a plan view.

4. The attachment structure for a side airbag device according to claim 1, wherein the attachment member is included in the side airbag device.

* * * * *